United States Patent
Kühne et al.

(10) Patent No.: US 11,928,254 B2
(45) Date of Patent: Mar. 12, 2024

(54) VIRTUAL REALITY GLASSES

(71) Applicant: HOLORIDE GMBH, Munich (DE)

(72) Inventors: Marcus Kühne, Markkleeberg (DE); Daniel Profendiner, Ingolstadt (DE)

(73) Assignee: HOLORIDE GMBH, Munich (DE)

( * ) Notice: Subject to any disclaimer, the term of this patent is extended or adjusted under 35 U.S.C. 154(b) by 0 days.

(21) Appl. No.: 18/043,847

(22) PCT Filed: Aug. 30, 2021

(86) PCT No.: PCT/EP2021/073873
§ 371 (c)(1),
(2) Date: Mar. 2, 2023

(87) PCT Pub. No.: WO2022/049027
PCT Pub. Date: Mar. 10, 2022

(65) Prior Publication Data
US 2023/0280823 A1    Sep. 7, 2023

(30) Foreign Application Priority Data

Sep. 4, 2020 (DE) .............. 10 2020 123 226.8

(51) Int. Cl.
*G06F 3/01* (2006.01)
*G02B 27/01* (2006.01)

(52) U.S. Cl.
CPC .......... *G06F 3/011* (2013.01); *G02B 27/0101* (2013.01); *G02B 27/017* (2013.01); *G02B 27/0179* (2013.01); *G02B 2027/0138* (2013.01); *G02B 2027/014* (2013.01); *G02B 2027/0178* (2013.01); *G02B 2027/0183* (2013.01)

(58) Field of Classification Search
None
See application file for complete search history.

(56) References Cited

U.S. PATENT DOCUMENTS

| | | |
|---|---|---|
| 2011/0221896 A1 | 9/2011 | Haddick |
| 2017/0072316 A1 | 3/2017 | Finfter |
| 2018/0040163 A1 | 2/2018 | Donnelly |
| 2019/0356705 A1 | 11/2019 | Escudero |
| 2020/0276917 A1* | 9/2020 | Profendiner ...... B60R 21/01512 |

FOREIGN PATENT DOCUMENTS

| | | |
|---|---|---|
| DE | 202018106198 U1 | 1/2019 |
| WO | 2018095196 A1 | 5/2018 |

OTHER PUBLICATIONS

International Search Report and Written Opinion from International Application No. PCT/EP2021/073873, dated Mar. 3, 2022; (24 pages).
International Preliminary Report on Patentability from International Application No. PCT/EP2021/073873, dated Dec. 14, 2022 (26 pages).

* cited by examiner

*Primary Examiner* — Christopher J Kohlman
(74) *Attorney, Agent, or Firm* — FITCH, EVEN, TABIN & FLANNERY LLP

(57) ABSTRACT

The invention relates to virtual reality glasses for a vehicle, which glasses are designed to display virtual contents coordinated with movements of the vehicle, wherein the virtual reality glasses have a chin strap by means of which the virtual reality glasses can be secured in a chin region of a wearer of the virtual reality glasses, and/or the virtual reality glasses are set up to allow the virtual contents to be displayed only if the performance of a safety measure has been detected by the virtual reality glasses.

7 Claims, 2 Drawing Sheets

VIRTUAL REALITY GLASSES

CROSS-REFERENCE TO RELATED APPLICATIONS

This application is a U.S. National Phase Application of International Application No. PCT/EP2021/073873, filed Aug. 30, 2021, designating the United States, which claims priority to German Application No. 10 2020 123 226.8, filed Sep. 4, 2020.

FIELD

The present invention relates to virtual reality glasses.

BACKGROUND

Virtual reality glasses have been used in a wide variety of fields for some time now. For example, virtual reality glasses are known to be used to display computer games. In the future, it can be expected that virtual reality glasses will be increasingly used for entertainment purposes in motor vehicles or other vehicles.

It is the object of the present invention to provide a solution which enables particularly safe operation of virtual reality glasses in a vehicle.

SUMMARY

This object is achieved by virtual reality glasses having the features of claim 1. Further possible embodiments of the invention are indicated in the dependent claims, the description and the figures.

The virtual reality glasses according to the invention for a vehicle are designed to display virtual content coordinated with movements of the vehicle, wherein the virtual reality glasses have a chin strap by means of which the virtual reality glasses can be secured in a chin region of a wearer of the virtual reality glasses. The chin strap can, by way of example, be designed in a manner similar to that of bicycle helmets or, for example, ski helmets, such that the chin strap can, for example, have a fastener that can be opened and closed. After the fastener is closed, the chin strap then ensures that the virtual reality glasses can be held on the head of the wearer concerned in a particularly captive manner. The chin strap can, for example, also be elastic and does not necessarily have to have a fastener, but can do. In the event of particularly high accelerations or decelerations in the motor vehicle or vehicle, the chin strap can ensure that the virtual reality glasses nevertheless remain firmly fixed to the head, in particular by means of the chin strap in the wearer's chin region. The chin strap thus provides an additional safety measure that can prevent the virtual reality glasses from detaching from the wearer's head, for example during sharp decelerations, when the head of the wearer of the virtual reality glasses is accelerated forwards and partly downwards, such that the wearer has, for example, their eyes more or less directed downwards. Particularly in such situations, the chin strap can ensure that the virtual reality glasses do not detach from the head of the wearer of the virtual reality glasses.

The virtual reality glasses do not have to be designed solely to display purely virtual content. The virtual reality glasses can, for example, also be designed to display augmented reality content or even mixed reality content. In particular, if the virtual reality glasses have a relatively high mass, the chin strap can provide an additional safety measure that can reliably prevent the virtual reality glasses from detaching from the head of the wearer of the virtual reality glasses. Thus, if the wearer's head flies forwards because it makes a corresponding nodding movement due to corresponding accelerations in the motor vehicle or vehicle, the chin strap ensures that the virtual reality glasses nevertheless do not fly off the wearer's head when the wearer of the virtual reality glasses makes such a nodding movement.

According to the invention, it is also possible for the virtual reality glasses not to have a chin strap. In other words, the chin strap need not be a mandatory component of the virtual reality glasses according to the invention.

As an alternative or in addition to the chin strap, the virtual reality glasses are configured according to the invention to allow the virtual content to be displayed only if the performance of a safety measure has been detected beforehand by the virtual reality glasses. In this way, it can be ensured that the wearer of the virtual reality glasses performs said safety measure if they also wish to use the virtual reality glasses to display the content. If the wearer does not perform the safety measure, the virtual reality glasses are configured to prevent the virtual content from being displayed. In such a case, it is very likely that the wearer will then take off the virtual reality glasses again or simply perform the required safety measure in order to be able to display the virtual content using the virtual reality glasses.

A further possible embodiment of the invention provides that the safety measure comprises a symbol having been detected by means of an optical detection apparatus of the virtual reality glasses, which symbol is arranged on a presentation surface on which safety instructions, in particular an instruction concerning the fastening of the chin strap, are indicated. The detection apparatus of the virtual reality glasses can be, for example, a camera. This camera can, for example, be used for inside-out tracking of the virtual reality glasses and additionally be used to optically detect said symbol. In principle, it can be any type of symbol, wherein the symbol can be, for example, a QR code. The presentation surface can, for example, be a sticker on which said instructions are printed. The presentation surface can also, for example, be a display, wherein said symbol is shown by means of the display, wherein, in addition, the display can then show the safety instructions, for example the instruction concerning the fastening of the chin strap. The wearer of the virtual reality glasses must therefore first orientate the virtual reality glasses correctly so that the symbol can actually be detected by the detection apparatus of the virtual reality glasses. Thereafter, the wearer will be practically forced to look at the presentation surface on which said safety instructions are indicated. The virtual reality glasses are therefore designed to detect whether the detection apparatus of the virtual reality glasses has actually detected the symbol, in which case it can be assumed that the wearer of the virtual reality glasses has also noticed the safety instructions.

According to a further possible embodiment of the invention, it is provided that the safety measure comprises detecting a distance from a front seat and checking that the distance does not fall below a predefined minimum distance. In particular, this can also be combined with said symbol being attached to the rear of a headrest of the front seat, for example. The detection of said symbol can therefore additionally be combined with the check that the distance from the front seat does not fall below the predefined minimum distance. Should, for example, the relevant front seat be too far back and/or the wearer of the virtual reality glasses have tilted their head too far forwards, the safety measure takes effect, as a result of which no content is displayed by means of the virtual reality glasses. Either the wearer of the virtual reality glasses must move their head further back and/or the front seat must be moved further forwards accordingly so that the predefined minimum distance can be maintained. This can likewise enhance the safety of the wearer of the virtual reality glasses in the vehicle. A sensor system built into the virtual reality glasses can measure the distance from the front seat—even without detecting the symbol, e.g. in the form of a QR code. This is also possible, for example, using a TOF (time off light) camera built into the virtual reality glasses. Alternatively or additionally, suitable algorithms can also be used which are designed to evaluate images of the vehicle interior which are taken by means of a camera system of the virtual reality glasses and to determine the distance from the front seat on the basis of said images.

In a further possible embodiment of the invention, it is provided that the virtual reality glasses are configured to stop displaying the virtual content and/or to issue a warning as soon as it is detected that the distance from the front seat has fallen below the predefined minimum distance. This procedure can also be used repeatedly, in particular during use of the virtual reality glasses. If, for example, said symbol comes too close to the virtual reality glasses, it can be assumed that the front seat has been moved too far back, which could be safety-critical. In such a case, the conventional usability of the virtual reality glasses can be suspended such that virtual content is no longer displayed by means of the virtual reality glasses. Alternatively or additionally, said warning can be issued, in particular visually, stating that the distance from the front seat has fallen below the predefined minimum distance. Both measures help to make the wearer of the virtual reality glasses aware that they may not be at a sufficient distance from the relevant front seat, thereby prompting them to change this, as they will most likely wish to continue to view the virtual content using the virtual reality glasses and/or wish for the warning message shown to no longer be displayed.

A further possible embodiment of the invention provides that the safety measure comprises an instruction displayed by means of the virtual reality glasses having been closed by clicking as a result of a predefined user action by the wearer of the virtual reality glasses. Thus, before the virtual reality glasses display their actual virtual content, after the virtual reality glasses have been donned, said instruction is first shown by means of said glasses, wherein the wearer of the virtual reality glasses must click to close this instruction by way of a predefined user action. The predefined user action can be, for example, a voice command, a particular hand gesture or the like. The instruction may, for example, be a disclaimer and/or guidance on how to correctly fasten the chin strap.

According to a further possible embodiment of the invention, it is provided that the virtual reality glasses are configured to allow the instruction to be closed by clicking only when the wearer has selected and confirmed a particular displayed confirmation region. The selection and subsequent confirmation of the confirmation region can be understood as part of the predefined user action. The wearer of the virtual reality glasses must therefore actively take certain steps in order for the instruction to be actually closed by clicking and thus hidden by the virtual reality glasses. This draws the wearer's attention to this confirmation region, where, for example, additional safety instructions or the like can be displayed. This also increases safety when wearing the virtual reality glasses in the vehicle.

In a further possible embodiment of the invention, it is provided that the virtual reality glasses are configured to display the confirmation region at a different position each time. In this way, it can be ensured with a high degree of probability that the wearer cannot at some point simply blindly, that is, without having to focus their eyes on the confirmation region, click to close the instruction displayed by means of the virtual reality glasses. Instead, the wearer must repeatedly direct their attention to or look at different positions within a display region of the virtual reality glasses in order to locate the confirmation region at all and then to be able to select it and click to close it. As a result, the wearer's attention is repeatedly drawn to said instruction, which comprises, for example, a disclaimer or instructions on how to correctly fasten the chin strap.

In a further possible embodiment of the invention, it is provided that the virtual reality glasses are configured to read out the instruction and only allow the instruction to be closed by clicking thereafter. For this purpose, the virtual reality glasses can have, for example, headphones via which the instruction is read out or issued. Every time before using the virtual reality glasses, the wearer of the virtual reality glasses must therefore listen to the instruction before being able to actually click to close the instruction and thus enjoy the actual reproduction of the virtual content. For example, in the course of the instruction shown, the wearer can view and hear guidance on how to correctly fasten the chin strap in order to ensure the safest possible operation of the virtual reality glasses during travel in the vehicle.

A further possible embodiment of the invention provides that the chin strap has a sensor which is designed to detect whether the chin strap is properly fastened when the virtual reality glasses are donned, wherein the safety measure comprises checking that the chin strap is properly fastened. For example, if the sensor detects that the chin strap is not fastened at all or is fastened incorrectly, the virtual reality glasses may be configured to display no content at all, or at least no entertainment content, as long as the sensor detects that the virtual reality glasses are not correctly donned because the chin strap is not properly fastened. If the chin strap has a fastener, the sensor can be integrated into this fastener, for example, such that the sensor can at least detect whether the fastener of the chin strap has been closed. Alternatively or additionally, the sensor may, for example, have capacitive sensors which are arranged at different points on the chin strap, such that it can be determined or detected whether the chin strap is resting as closely as possible to the chin and the rest of the facial area of the wearer of the virtual reality glasses.

Further features of the invention may be apparent from the following description of the figures and from the drawing. The features and combinations of features mentioned above in the description as well as the features and combinations of features shown below in the description of figures and/or in the figures alone can be used not only in the combination indicated in each case, but also in other combinations or in isolation without departing from the scope of the invention.

BRIEF DESCRIPTION OF THE DRAWINGS

Shown are.

Identical or functionally identical elements are provided with the same reference signs in the figures.

DESCRIPTION OF THE PREFERRED EMBODIMENTS

Figure 1:
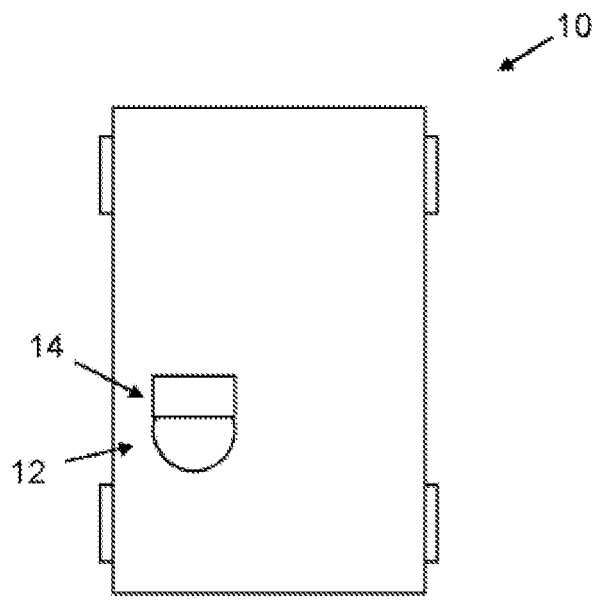
FIG. 1 a schematic top view of a motor vehicle in which a person who has donned virtual reality glasses is schematically shown.

A motor vehicle 10 is shown in a schematic top view in FIG. 1, which illustrates a person 12 who has donned virtual reality glasses 14. In the following, the wearer 12 is always referred to wherever the person 12 is meant.

Figure 2:
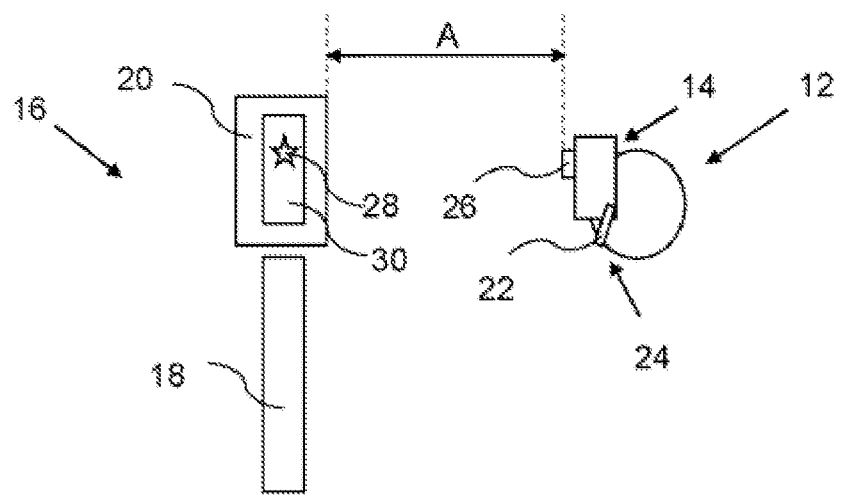
FIG. 2 a schematic side view in which the wearer of the virtual reality glasses and a front seat are indicated.

In FIG. 2, the wearer 12 is shown in a schematic side view with the virtual reality glasses 14 donned. In front of the wearer 12 is a front seat 16 comprising a backrest 18 and a headrest 20. As schematically indicated here, the virtual reality glasses 14 comprise a chin strap 22 by means of which the virtual reality glasses 14 can be secured in a chin region 24 of the wearer 12. The chin strap 22 can, for example, have a fastener (not illustrated here) by means of which the chin strap 22 can be closed and released. Alternatively or additionally, the chin strap 22 can also be made, for example, of such an elastic material that it can be easily slipped over the chin region 24 of the wearer 12 after the wearer has donned the virtual reality glasses 14. For example, if the motor vehicle 10 brakes very abruptly, the head of the wearer 12 will most likely perform a corresponding forward nodding movement. The chin strap 22 can ensure that the virtual reality glasses 14 remain securely fixed to the head of the wearer 12 even in such situations.

The virtual reality glasses 14 are configured to allow virtual content to be displayed only if the performance of a safety measure has been detected beforehand by the virtual reality glasses. In particular, the virtual reality glasses 14 may be configured not to reproduce at least such virtual content that is purely for entertainment purposes until the performance of said security measure has been detected by the virtual reality glasses 14.

The safety measure can, for example, comprise a symbol 28 having been detected by means of an optical detection apparatus 26 of the virtual reality glasses 14, which symbol is arranged on a presentation surface 30 on which safety instructions, in particular instructions concerning the correct fastening of the chin strap 22, are indicated. The symbol 28 can be, for example, a QR code or even other symbols, which can, for example, be attached to a rear side of the headrest 20, which rear side is not specified in more detail. The presentation surface 30 can, for example, be a patch or a sticker on the rear side of the headrest 20. The presentation surface 30 can also be, for example, a display integrated into the headrest 20, in which case the display can also be designed to show said symbol 28.

The wearer 12 must therefore orientate their head in such a way that the detection apparatus 26, which may be, for example, a camera used for inside-out tracking, is accordingly directed towards the rear side of the headrest 20 such that the symbol 28 can actually be detected. The wearer 12 must therefore automatically orientate their head such that they can see the presentation surface 30. As a result, the wearer can also recognise appropriate instructions that are printed on or displayed by means of the presentation surface 30.

Said safety measure can also comprise detecting a distance A from the front seat 16 and checking that the distance A does not fall below a predefined minimum distance. For example, if the front seat 16 has been moved too far back, the distance A is relatively small and it may be the case that this distance A is smaller than the predefined minimum distance. The virtual reality glasses 14 can be configured to stop displaying the virtual content, at least that which serves entertainment purposes, and/or to issue a warning as soon as it is detected that the distance from the front seat 16 has fallen below the predefined minimum distance, that is, the distance A just detected is too small. The distance A can also be determined, for example, by means of the detection apparatus 26, which can, for example, be camera-based, by detecting the symbol 28 using the detection apparatus 26 and determining the current distance A based thereon.

Figure 3:
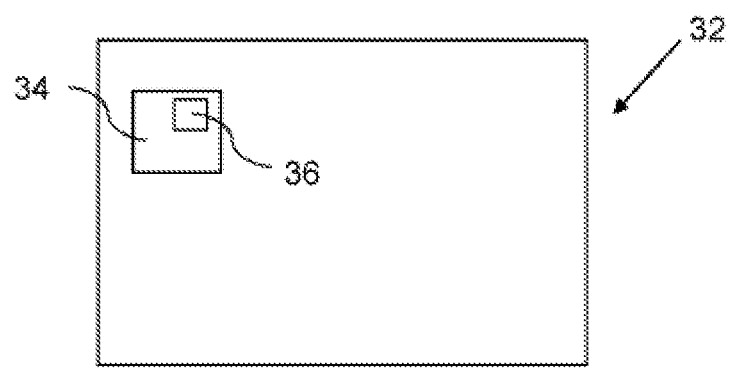
FIG. 3 a schematic illustration of a display surface of the virtual reality glasses.

FIG. 3 schematically illustrates a display region 32 of the virtual reality glasses 14. Said safety measure may further comprise an instruction 34 displayed by means of the virtual reality glasses 14 having been closed by clicking as a result of a predefined user action by the wearer 12 of the virtual reality glasses 14. The virtual reality glasses 14 can be configured to allow the instruction 34 to be closed by clicking only when the wearer 12 has selected and confirmed a particular displayed confirmation region 36. The confirmation region 36 can be displayed at a different position each time. In particular, the confirmation region 36 can be shown within the displayed instruction 34, such that the wearer 12 is also forced to automatically look at the shown instruction 34, which can have, for example, guidance on how to fasten the chin strap 22 of the virtual reality glasses 14. Alternatively or additionally, the instruction 34 can contain, for example, a disclaimer.

The virtual reality glasses 14 can, for example, have a viewing direction detection apparatus which can be designed to detect a respective viewing direction of the wearer 12 of the virtual reality glasses 14 and thus determine whether the wearer 12 has just looked at the confirmation region 36. As a result, the confirmation region 36 can be selected, for example, wherein a confirmation can be, for example, a specific blinking action or the like. Other selection mechanisms and confirmation mechanisms are also possible by means of which the wearer 12 of the virtual reality glasses 14 can select and then confirm the confirmation region 36 in order to close the instruction 34 by clicking on it, that is, to hide it.

The virtual reality glasses 14 can also be configured to read out the instruction 34 and only allow the instruction 34 to be closed by clicking thereafter. In addition, it is also possible for the chin strap 22, which is not illustrated here, to have a sensor that is designed to detect whether the chin strap 22 is properly fastened when the virtual reality glasses 14 are donned. In this context, the safety measure can comprise checking that the chin strap 22 is properly fastened. For example, the sensor can have one or more capacitive sensors designed to determine whether the chin strap 22 is correctly fastened, in particular in the chin region 24 of the wearer 12. Alternatively or additionally, the chin strap 22 can also have, for example, a fastener into which the sensor can be integrated such that the sensor can at least determine whether the fastener of the chin strap 22 is closed.

The chin strap 22 and the further measures help to enhance safety when using the virtual reality glasses 14 in the motor vehicle 10 or even in other vehicles. The virtual reality glasses 14 do not necessarily have to have the chin strap 22. Instead, in the absence of the chin strap 22, the virtual reality glasses 14 can be configured to allow virtual content to be displayed only if the performance of at least one of the aforementioned security measures has been detected beforehand by the virtual reality glasses 14.

LIST OF REFERENCE SIGNS

10 Motor vehicle
12 Wearer
14 Virtual reality glasses
16 Front seat
18 Backrest
20 Headrest
22 Chin strap
24 Chin region
26 Detection apparatus
28 Symbol
30 Presentation surface
32 Display region
34 Instruction
36 Confirmation region
A Distance from front seat

The invention claimed is:

1. Virtual reality glasses for a vehicle, which glasses are designed to display virtual content coordinated with movements of the vehicle,
wherein the virtual reality glasses are configured to allow the virtual content to be displayed only if, when the virtual reality glasses have been donned in the vehicle, performance of a safety measure has been detected by the virtual reality glasses,
wherein the safety measure comprises a sensor system built into the virtual reality glasses detecting a distance between the virtual reality glasses and a front seat and checking that the distance does not fall below a predefined minimum distance,
wherein the virtual reality glasses are configured to stop displaying the virtual content as soon as it is detected that the distance from the front seat has fallen below the predefined minimum distance.

2. The virtual reality glasses according to claim 1, wherein the safety measure comprises a symbol having been detected by means of an optical detection apparatus of the virtual reality glasses, which symbol is arranged on a presentation surface on which safety instructions are indicated.

3. The virtual reality glasses according to claim 1, wherein the virtual reality glasses are configured to issue a warning as soon as it is detected that the distance from the front seat has fallen below the predefined minimum distance.

4. The virtual reality glasses according to claim 1, wherein the safety measure comprises an instruction displayed by means of the virtual reality glasses having been closed by clicking as a result of a predefined user action by a wearer of the virtual reality glasses.

5. The virtual reality glasses according to claim 4, wherein the virtual reality glasses are configured to allow the instruction to be closed by clicking only when the wearer has selected and confirmed a particular displayed confirmation region.

6. The virtual reality glasses according to claim 5, wherein the virtual reality glasses are configured to display the confirmation region at a different position each time.

7. The virtual reality glasses according to claim 4, wherein the virtual reality glasses are configured to read out the instruction and only allow the instruction to be closed by clicking thereafter.

* * * * *